J. BIJUR.
SYSTEM OF DISTRIBUTION.
APPLICATION FILED NOV. 18, 1911.
1,124,277.
Patented Jan. 12, 1915.
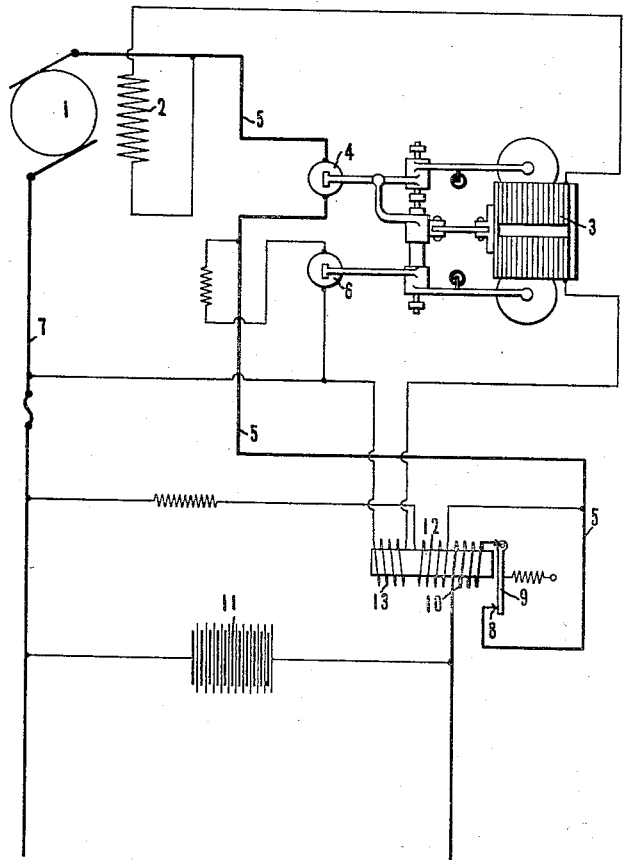

UNITED STATES PATENT OFFICE.

JOSEPH BIJUR, OF NEW YORK, N. Y., ASSIGNOR TO THE SAFETY CAR HEATING AND LIGHTING CO., OF NEW YORK, N. Y., A CORPORATION OF NEW JERSEY.

SYSTEM OF DISTRIBUTION.

1,124,277.  Specification of Letters Patent.  Patented Jan. 12, 1915.

Application filed November 18, 1911. Serial No. 660,946.

*To all whom it may concern:*

Be it known that I, JOSEPH BIJUR, a citizen of the United States, residing at New York city, in the county of New York and State of New York, have invented certain new and useful Improvements in Systems of Distribution, of which the following is a full, clear, and exact description, such as will enable others skilled in the art to which it appertains to make and use the same.

This invention relates to systems of electrical distribution, and with regard to the more specific features thereof, to means for controlling the connection of the generator with certain types of load.

One of the objects thereof is to provide practical and efficient means for controlling the connection of a generator with a load.

Another object is to provide means of the above type in which the action is reliable under all conditions of use.

Another object is to provide means of the above type of simple and inexpensive construction.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

The accompanying drawing is a diagrammatic view of one of various possible embodiments of this invention.

As conducive to a clearer understanding of certain features of this invention, it may first be noted that in the charging of storage or secondary batteries from a generator driven at variable speed, means are often provided to prevent an excessive voltage of the generator with a correspondingly excessive current in the battery, this holding true whether the regulation of the generator be for constant voltage or constant current or otherwise. Moreover, if connection is made between the generator and a battery with the former at too low a voltage, there is a tendency of the battery to discharge back through the generator. Accordingly, there is a somewhat limited range of voltage within which connection must be made for best results, and if the generator voltage be the controlling factor in establishing or breaking this connection, there is often a corresponding necessity for nice adjustment and a corresponding liability of the connecting switch not to give proper action. Obviously, with apparatus of this nature the connection must be made and must not be made at too low a voltage of the generator, and if it is not formed at the maximum voltage for which the generator is regulated under the conditions obtaining, it will not be formed at all and the battery will not be charged.

The provision of simple and practical means whereby the above difficulties are overcome is among the dominant aims of this invention.

Referring now to the accompanying drawing, there is shown at 1 a generator having a shunt field winding 2, in which is serially disposed a variable resistance device 3. The resistance of the latter is controlled conjointly by a current coil 4 serially disposed in the main 5 and a voltage coil 6 bridged across the mains 5 and 7. The action of this generator regulating apparatus and the features of construction thereof are fully set forth, described and claimed in my copending application, Serial No. 595,070, filed December 1, 1910, and it will be unnecessary to deal with them in detail in the present case. It may be noted, however, that this regulating apparatus prevents the rise of voltage of the generator beyond certain predetermined values by automatically increasing the resistance of the device 3 and thus weakening the field as the generator speeds up.

The main 5 leads through coil 4 and thence to a contact 8 which coacts with the spring retracted armature 9 to establish a circuit through the coil 10 and thence through the battery 11 or other load to the main 7.

Coacting with coil 10 is a voltage coil 12 bridged across the mains and so wound as to tend to close the switch member 9 and act cumulatively with the coil 10 in holding the switch closed during the charging of the battery.

Positioned upon the switching device controlling the member 9 is a current coil 13 serially connected in the field circuit of the generator and wound differentially with respect to the coil 12. These coils are so wound and connected as to present a total resultant magnetic field which will be of such value as to close the switch 9 at the certain predetermined voltage of the generator at which this action is desired. It is to be noted, however, that if for any reason the switch 9 is not closed at the limit of the voltage of the generator permitted by the regulating apparatus, it does not remain open upon further increase in speed, as, although the field of coil 12 may at this stage become a constant factor, nevertheless the field of the opposing coil 13 is further weakened, due to the cutting down of the field current, and hence the resultant field continues to increase until the switch member is closed against the contact 8. With the switch closed, the coil 10 acts in conjunction with this resultant field in maintaining the connection during the charging of the battery.

The operation of this apparatus will be clear from the above, and it is to be noted that although it is chiefly of value in connection with the charging of storage-batteries, nevertheless, it presents features of advantage when used to govern the connection of a generator of this general nature with a lamp load or the like.

It will thus be seen that there is provided apparatus in which the aims of this invention are achieved and which is of simple construction and thoroughly dependable action.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In apparatus of the class described, in combination, a generator, a switch connected in the external circuit of said generator, means tending to close said switch, means adapted to weaken the field of said generator as the speed of drive thereof increases, and means controlled in accordance with the field current of said generator and opposing said switch-closing means.

2. In apparatus of the class described, in combination, a shunt-wound generator, the field circuit of which comprises a variable resistance device, means tending to increase the resistance of said device as the speed of said generator increases a switch connected in circuit with said generator, means tending to close said switch, and means controlled in accordance with the field current of said generator and opposing said closing means.

3. In apparatus of the class described, in combination, a generator, regulating means for said generator a switch connected in circuit with said generator, and a pair of opposing devices jointly controlling the closing of said switch, one of which increases in effectiveness with increase in speed of said generator, and the other of which decreases in effectiveness with increase of said speed.

4. In apparatus of the class described, in combination, a generator, regulating means for said generator a switch connected in circuit with said generator, and a magnet comprising a pair of differentially wound coils controlling the closing of said switch, one of said coils being connected to increase its field strength as the speed of said generator increases and the other of said coils being connected to decrease its field strength with increase of said speed.

5. In apparatus of the class described, in combination, a source of current, a switch connected in circuit with said source of current, means controlled in accordance with the voltage of said source of current and tending to close said switch, means adapted to regulate the output of said source of current, and means affected by said regulating means and adapted to oppose said voltage-controlled means.

6. In apparatus of the class described, in combination, a shunt-wound generator, a main circuit, a switch connected in said main circuit, a coil presenting a field strength substantially proportional to the voltage of said generator and tending to close said switch, auxiliary means comprising a coil traversed by the field current of said generator and adapted to coact with said first coil in closing said switch and an automatically controlled variable resistance serially connected with said last coil in the field circuit, said voltage coil being connected in parallel with respect to the field circuit of the generator.

7. In apparatus of the class described, in combination, a shunt-wound generator, a main circuit, a switch in said circuit, a storage battery connected in said circuit, and magnetic means tending to actuate said switch comprising a voltage coil connected across said generator, a series coil connected in said circuit and a coil connected in the field circuit of said generator opposing said voltage coil.

8. In apparatus of the class described, in combination, a generator, a storage battery adapted to be charged thereby, a switch controlling the circuit from said generator to said battery, and controlling means for said switch, comprising a voltage coil connected across the generator, a current coil serially disposed in the circuit leading to said battery, and means adapted upon increase of generator speed to increase the effective field of said voltage coil at a rate greater than that of said speed increase.

9. In apparatus of the class described, in combination, a generator, a storage battery adapted to be charged thereby, a switch controlling the circuit from said generator to said battery, and controlling means for said switch, comprising a voltage coil connected across the generator, a current coil serially disposed in the circuit leading to said battery and an auxiliary device opposing the action of said voltage coil with a force which decreases as the speed of said generator increases.

10. In apparatus of the class described, in combination, a generator, regulating means for said generator a storage battery adapted to be charged thereby, a switch controlling the circuit from said generator to said battery, and controlling means for said switch, comprising a voltage coil connected across the generator, a current coil serially disposed in the circuit leading to said battery and a coil connected in parallel with said first-mentioned coil and wound to act differentially with respect to said series coil during the charging of said battery.

11. In an apparatus of the class described, in combination, a generator, a storage battery adapted to be charged thereby, a switch controlling the circuit from said generator to said battery, and controlling means for said switch, comprising a voltage coil connected across the generator, a current coil serially disposed in the circuit leading to said battery and a coil connected in the field circuit of said generator and wound to act differentially with respect to said series coil during the charging of said battery.

12. In apparatus of the class described, in combination, a shunt-wound generator, a variable resistance device connected in the field of said generator, means varying the resistance of said device as the output of said generator varies, a storage battery adapted to be charged from said generator, a switch controlling the circuit between said generator and said battery, and electro-magnetic means controlling said switch and comprising a voltage coil connected across said generator, a coil wound differentially with respect to said voltage coil and connected to present a field substantially proportional to the current flowing through the field of said generator and a current coil serially connected between said generator and said battery.

In testimony whereof I affix my signature in the presence of two witnesses.

JOSEPH BIJUR.

Witnesses:
P. A. BLAIR,
L. A. WATSON.